US012051317B2

(12) United States Patent
Ngala-Ngala et al.

(10) Patent No.: US 12,051,317 B2
(45) Date of Patent: Jul. 30, 2024

(54) ADAPTIVE AUTOMATED ALARM RESPONSE SYSTEM

(71) Applicant: Western Digital Technologies, Inc., San Jose, CA (US)

(72) Inventors: Guelord Kamitula Ngala-Ngala, Simpang Ampat (MY); Baskar Santhrasegran, Ipoh (MY); Charles Paul Manianglung Alfonso, Bayan Lepas (MY)

(73) Assignee: SanDisk Technologies, Inc., Milpitas, CA (US)

( * ) Notice: Subject to any disclaimer, the term of this patent is extended or adjusted under 35 U.S.C. 154(b) by 120 days.

(21) Appl. No.: 17/740,826

(22) Filed: May 10, 2022

(65) Prior Publication Data
US 2023/0368637 A1  Nov. 16, 2023

(51) Int. Cl.
G08B 21/18 (2006.01)
G08B 23/00 (2006.01)
G08B 25/00 (2006.01)
G05B 23/02 (2006.01)
G06T 7/73 (2017.01)

(52) U.S. Cl.
CPC ........... *G08B 21/187* (2013.01); *G08B 21/18* (2013.01); *G08B 23/00* (2013.01); *G08B 25/00* (2013.01); *G08B 25/002* (2013.01); *G05B 23/0272* (2013.01); *G06T 7/73* (2017.01); *G06T 2207/20081* (2013.01)

(58) Field of Classification Search
CPC ............... G08B 13/19; G08B 13/196; G08B 13/19641; G08B 13/19682; G08B 29/04; G08B 29/18; G06L 9/00; G06Q 10/00; G06Q 10/06; G06Q 10/06393
See application file for complete search history.

(56) References Cited

U.S. PATENT DOCUMENTS

| 11,158,177 B1 * | 10/2021 | ElHattab | G06V 10/945 |
| 2007/0033069 A1 * | 2/2007 | Rao | A63B 71/0622 482/8 |
| 2020/0104774 A1 * | 4/2020 | Sun | G06Q 10/06393 |
| 2020/0150638 A1 | 5/2020 | Mourzine et al. | |
| 2020/0175847 A1 * | 6/2020 | Kumar Srivastava | G08B 29/186 |

(Continued)

OTHER PUBLICATIONS

NPL Search (Nov. 2, 2023).*

*Primary Examiner* — Van T Trieu
(74) *Attorney, Agent, or Firm* — Vierra Magen Marcus LLP

(57) ABSTRACT

A central control circuit is configured to remotely connect to a plurality of machines over a network. Each machine has a respective user interface to indicate a machine state and enable user input. The central control circuit is configured to receive an alarm code, determine whether the alarm code corresponds to a machine state for which a machine learning application has been trained, and obtain an image from the user interface in response to a determination that the machine learning application has been trained for the machine state. The central control circuit is further configured to analyze the image to identify one or more features, generate one or more commands in the machine learning application, and send the one or more commands to the user interface according to the features to change the machine state.

20 Claims, 16 Drawing Sheets

(56) References Cited

U.S. PATENT DOCUMENTS

| | | |
|---|---|---|
| 2021/0096551 A1 | 4/2021 | Sayyarrodsari et al. |
| 2021/0288988 A1 | 9/2021 | Baughman et al. |

\* cited by examiner

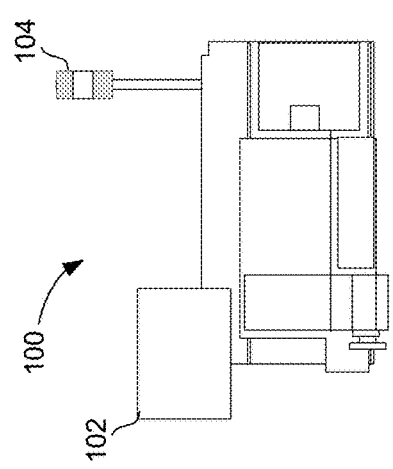
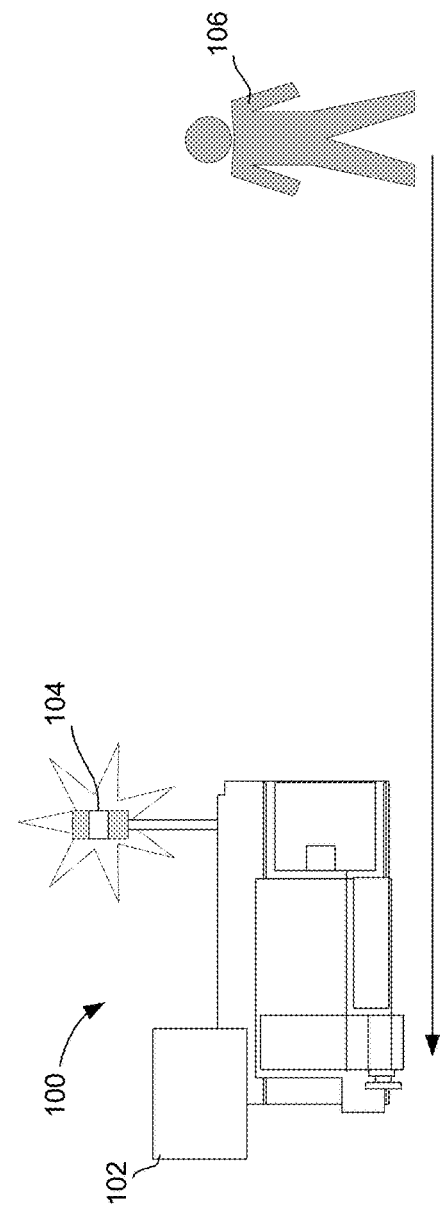

ADAPTIVE AUTOMATED ALARM RESPONSE SYSTEM

BACKGROUND

Integrated Circuits (ICs, also referred to as "IC dies," "dies," or "chips") including semiconductor memory dies may be manufactured using a series of steps performed by machines (tools) in a dedicated manufacturing facility or fabrication facility ("fab"). Such semiconductor memory dies may be assembled with additional components (e.g., additional dies such as controller dies) to form larger assemblies (e.g., memory cards, USB drives, Solid State Drives (SSDs), and other consumer electronic products). Assembly may include a series of steps (e.g., packaging, attachment to a Printed Circuit Board (PCB), wire bonding, etc.) which are performed by machines in a manufacturing facility. The resulting products may then be tested by machines in a test facility, which may be separate from or integrated with the manufacturing facility. Individual machines may have alarm systems that indicate when the machine requires human intervention so that someone can go to the machine and perform whatever actions may be necessary to keep the machine operating efficiently.

Semiconductor memory is an example of a semiconductor product that is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory.

BRIEF DESCRIPTION OF THE DRAWINGS

Like-numbered elements refer to common components in the different figures.

FIGS. 1A-B illustrate an example of a machine that includes a light tower to indicate an alarm state to an operator.

DETAILED DESCRIPTION

Figure 2:
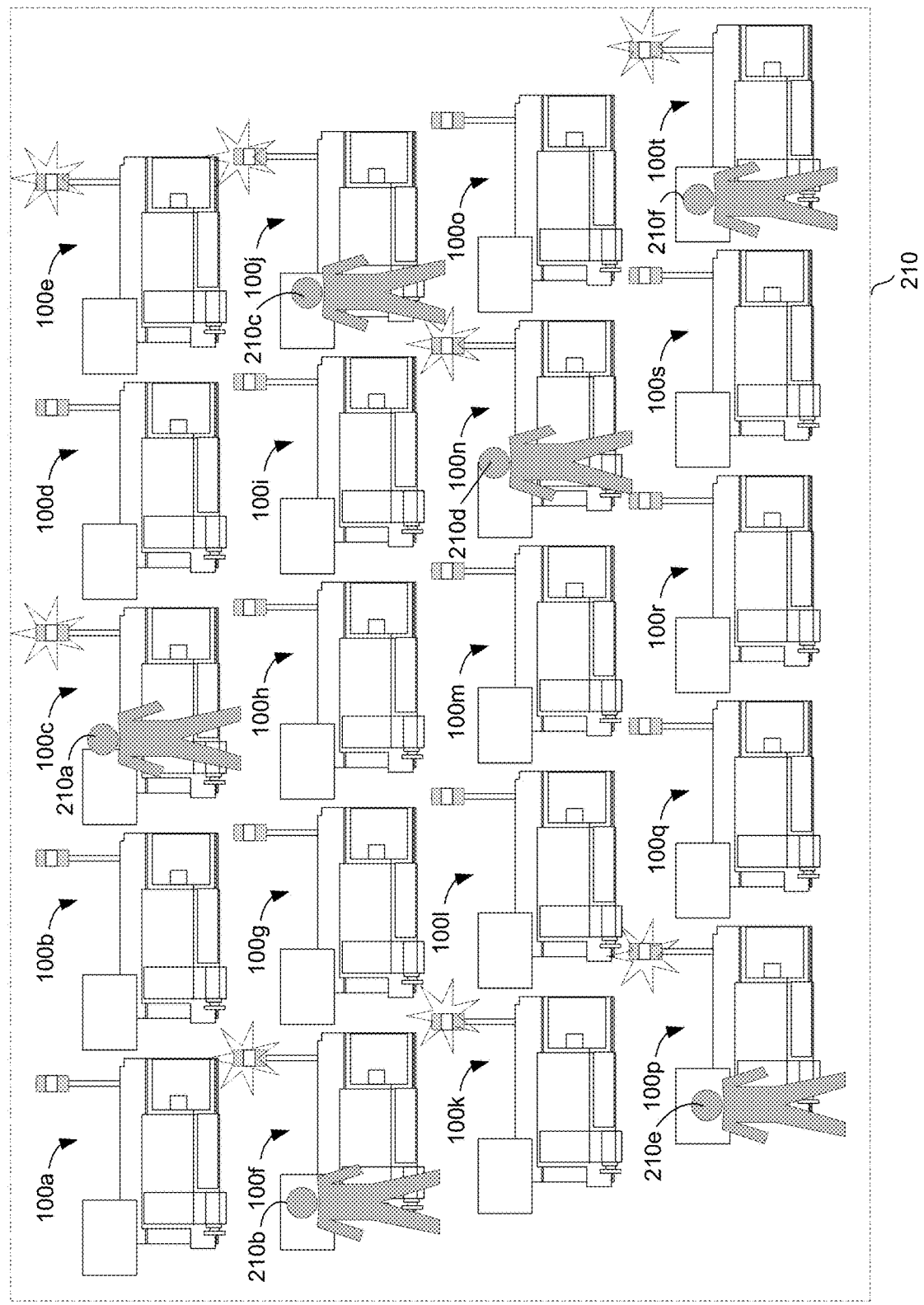
FIG. 2 illustrates a facility that includes a plurality of machines and a plurality of operators to resolve alarms.

Techniques are provided for efficient operation of facilities (e.g., manufacturing and/or testing facilities) that include multiple machines that may experience failure so that such failures are rapidly and efficiently addressed. While alarms that are directed to humans (e.g., operators, technicians or other facility personnel) may enable identification of machines that are in an alarm state and subsequent human intervention to address underlying problems, this approach may require significant personnel to ensure a timely response. Humans responding to such alarms may have to walk relatively long distances between machines and may only deal with alarms sequentially (e.g., fixing one machine with an alarm, subsequently walking to another machine with an alarm and fixing it). Personnel may require significant training that is specific to the machines in a facility. Such training may be costly, time consuming, and may generally increase the cost of operating a facility efficiently. Efficiently operating such facilities presents technical problems that are addressed by aspects of the present technology.

Aspects of the present technology are directed to systems that include one or more central control circuits that are configured to connect to multiple machines (e.g., in a manufacturing and/or test facility) over a network and to respond to alarms (at least some of the alarms that a machine may generate) remotely so that a machine may be returned to production (e.g., returned from an alarm state to a non-alarm state) without direct human intervention. A Central Command System (e.g., a system that includes central control circuits, which may be referred to as an intelligent Central Command System, or "iCCS") may be connected to user interfaces of machines in such a way that the central control circuits in a Central Command System can remotely interface with individual machines (e.g., using systems that allow personnel to "remote in" to machines). For example, control circuits in a Central Command System may obtain images, video, sound, or other data from user interfaces and may issue commands to user interfaces of machines.

In an example, control circuits in a Central Command System (central control circuits) may include or be connected to a machine learning application (Artificial Intelligence, or AI application) that generates commands according to data obtained from machines (e.g., via user interfaces, or otherwise). Such a machine learning application may be trained using a training set generated from recordings of successful human input (human intervention) to address machines in different alarm states in what may be referred to as an "Intelligent Central Command System self-Alarm Assist". Central control circuits may respond to alarm states of multiple machines in parallel and may respond without the latency that results from personnel having to walk from machine to machine. Central control circuits may operate continuously (e.g., 24 hours a day, 365 days a year) and are not subject to human workplace restrictions (e.g., restrictions related to infectious diseases such as COVID-19). Thus, aspects of the present technology address various problems of operating facilities with multiple machines efficiently.

FIG. 1A shows an example of a machine 100 in a manufacturing facility. For example, machine 100 may perform one or more steps on workpieces (e.g., silicon wafers, IC dies, PCBs, electronic assemblies). For example, machine 100 may be a backgrind machine, a dicing machine, a surface mount machine, a die attach machine, a test machine, a wire bonding machine or other machine in a manufacturing facility (in the present document, the term "manufacturing facility" is used to refer to a facility where manufacturing machines are used for manufacturing, and where additional machines (e.g., test machines) may be used for related operations).

Machine 100 has a user interface for interfacing with a human user, for example, to provide information regarding machine 100 to a user and to accept input from the user (e.g., commands) to allow a user to control operation of machine 100. FIG. 1A shows a monitor 102, which is an example of a user interface device that may provide visual information to a user (e.g., may show the current operation of machine 100 and any workpieces that machine 100 may be operating on). Monitor 102 may include a touchscreen that accepts user input (e.g., allows a user to move a pointer by moving a finger along a surface) so that it may be both an output device that provides information to a user and an input device that accepts input from a user (input/output device, or I/O device). In addition to monitor 102, machine 100 has a light tower 104 (stack light), which provides certain information regarding machine 100. For example, light tower 104 may have multiple differently colored lights (e.g., 3-5 lights) that indicate multiple machine states. In an example, a green light indicates a "normal," "running" or non-alarm machine state, a yellow/amber light indicates a warning (e.g., an alarm state that may require attention but may allow production to proceed), and a red light indicates a failure condition (e.g., an alarm state that prevents further operation until fixed). Other schemes are also used. In general, a light tower such as light tower 104 provides a visual indicator of a limited amount of data that is available in more detail elsewhere (e.g., monitor 102 may provide more details regarding machine state including any alarm state indicated by light tower 104, for example, as an error code or alarm code and/or other information). While monitor 102 and light tower 104 are examples of user interface components, other components may be provided instead of, or in addition to those shown. For example, audible alarm device or other output device may be provided and/or various user input devices may be provided (e.g., a touchpad, trackball, lightpen, buttons, switches, dials, and/or keyboard). Any one or more of such devices that alone or together enable information to be provided from a machine to a user and input to be accepted from a user to the machine may be considered as a user interface.

FIG. 1B shows an example of machine 100 in which the machine state is an alarm state (e.g., after a transition from a non-alarm state to an alarm state). Light tower 104 may show a colored light that corresponds to an alarm state (e.g., red light) and monitor 102 may provide additional details regarding the alarm state. For example, monitor 102 may show an alarm code that may correspond to a parameter (e.g., temperature, pressure, humidity, chemical concentration, pH, voltage or current) that is out of a specified range, may indicate detection of breakage or misalignment (e.g., of a workpiece) or other alarm details. In addition, monitor 102 may show options to address the alarm state (e.g., retry, reset, override, change one or more settings, manually move one or more items, or other actions) and may enable a user to provide appropriate input (e.g., via touchscreen or other I/O device) to select an option (e.g., select from a menu such as a drop-down or pop-up menu, select by selecting a button, text entry, or otherwise). To resolve the alarm state indicated to user 106 by light tower 104, user 106 (e.g., an operator, technician, or other facility worker) may walk to a location adjacent to machine 100 (indicated by the arrow), read details of the alarm state from monitor 102, determine an appropriate course of action (e.g., based on training and/or consulting with a manual or other material and/or consulting with additional facility personnel), enter corresponding input (e.g., via monitor 102 or other user interface component). If this is unsuccessful (e.g., if machine 100 remains in an alarm state), user 106 may enter additional input. In general, the time to resolve an alarm in this way includes time for user 106 to get to machine 100, acquire sufficient information about the alarm, select an appropriate response, and provide input to the user interface to execute the selected response. This may take significant time.

The problems of resolving alarm states in an efficient timely manner are compounded when multiple machines operate in a facility. FIG. 2 illustrates an example of a plurality of machines 100a-t in a portion of a facility 210. Machines 100a-t may each have a user interface that includes a monitor and light tower and/or other input and/or output components (e.g., similar to machine 100 of FIGS. 1A-B). Machines 100a-t may be similar machines performing similar functions or may be different and may perform different functions. For example, different machines may perform different steps in a manufacturing facility with workpieces being moved from one machine to another during manufacturing. Also shown are facility personnel 212a-f (e.g., operators, technicians, engineers). Facility personnel 212a-f may move to a machine showing an alarm state (e.g., via a light tower) and resolve the problem (cause the machine to transition to a non-alarm state) by entering appropriate input via one or more input devices of the machine's user interface. While facility personnel 212a-f are resolving problems with individual machines, other machines that are in alarm states may be unattended (e.g., machines 100e and 100k), which may hold up production. While the portion of the facility 210 illustrated includes twenty machines (four rows of five machines each), real facilities may have much larger numbers of machines (e.g., hundreds of machines), which require large numbers of trained personnel accordingly. In facilities that operate for extended hours (e.g., twenty four hours a day), sufficient trained personnel may be needed throughout several shifts each day.

Figure 3:
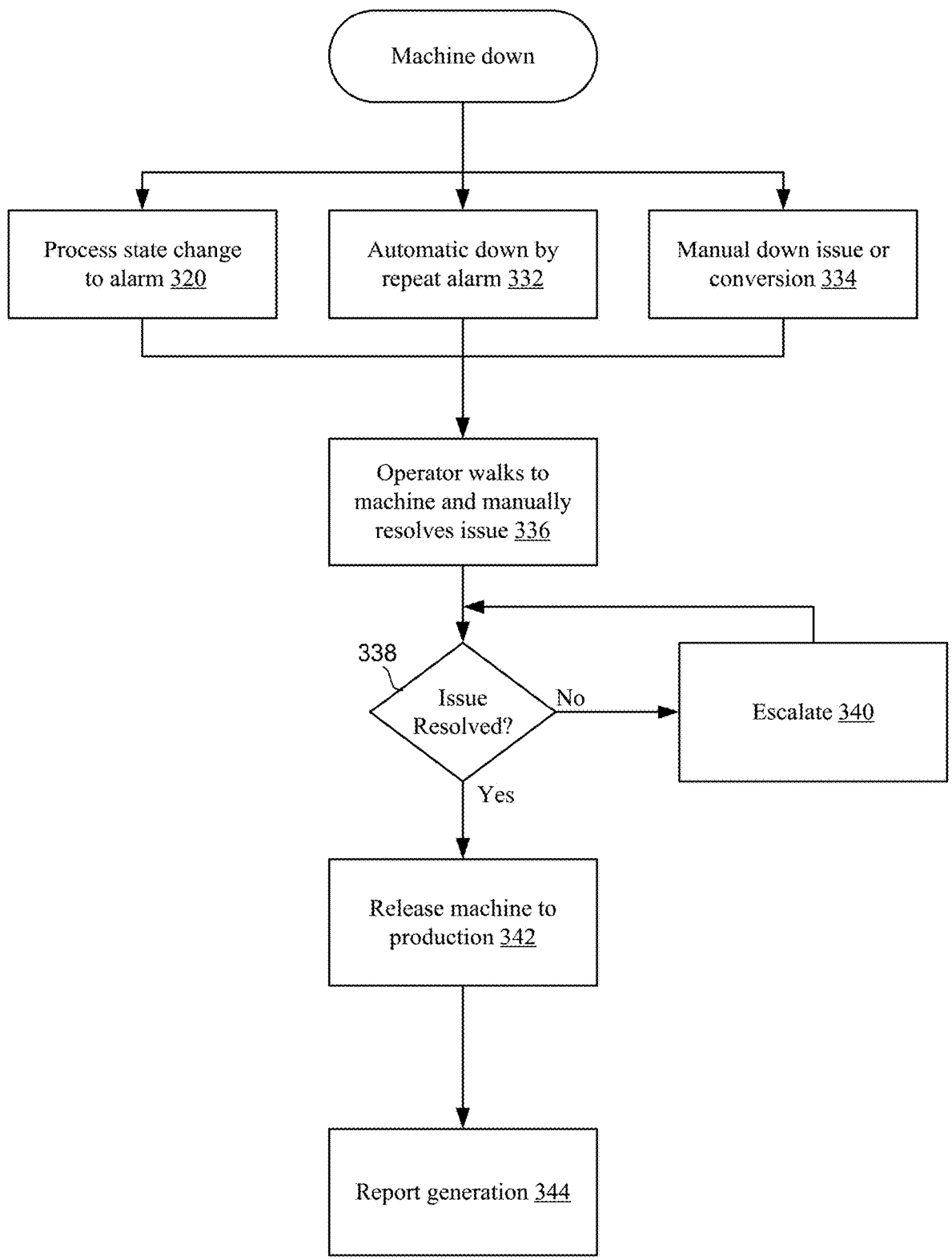
FIG. 3 illustrates an example of how operators deal with alarms in a facility.

FIG. 3 illustrates an example of how machine alarms may be resolved in a facility that uses facility personnel at the machine (e.g., as illustrated in FIG. 2). A machine down (machine is no longer running) may occur when a process state changes to alarm 320, as a result of an automatic down from repeat alarms 322 (e.g., repeated low-level alarms or warnings), or from a manual down issue or conversion 334 (e.g., facility personnel indicate the machine is down). Any of these conditions may cause a machine state to change from a non-alarm state to an alarm state, which may cause a light tower or other output device to indicate the alarm state. An operator (user) walks to the machine and manually resolves the issue 336 (e.g., pushes buttons, moves a pointer (cursor), enters text, or otherwise provides some input) and determines if the issue is resolved 338. If the issue is not resolved by the user, then the problem may be escalated 340 (e.g., calling a more experienced operator, technician, engineer, machine vendor, or other appropriate individual). If the problem is resolved (e.g., if the machine transitions from an alarm state to a non-alarm state) then the machine is released to production 342 and a report is generated 344 (e.g., by the user or logged by the machine).

Figure 4:
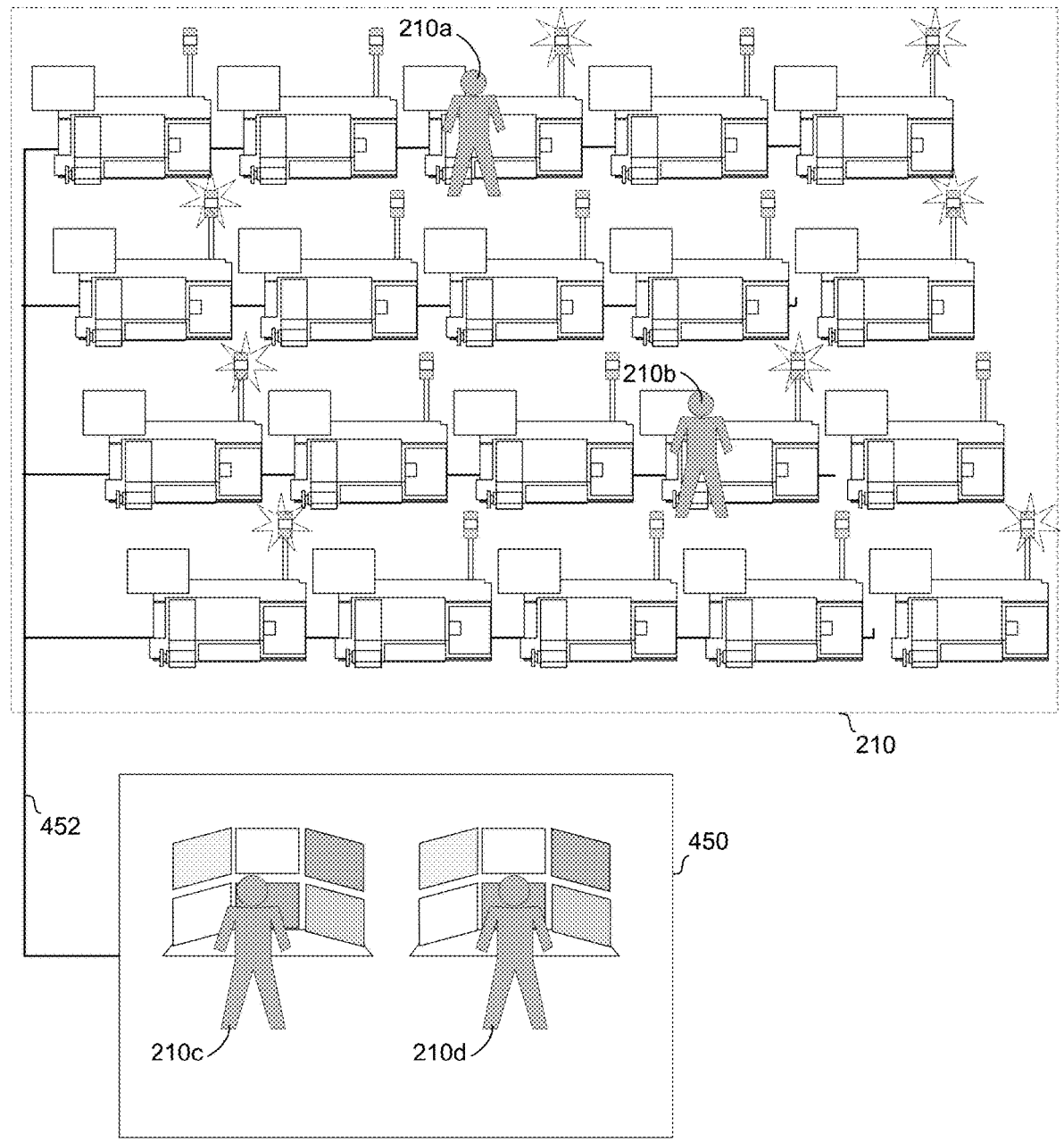
FIG. 4 illustrates an example of machines connected to a central control room by a network.

FIG. 4 shows an alternative arrangement to the arrangement of FIG. 2. FIG. 4 shows a central control room 450, which is connected by a network 452 to each machine in facility 210. While personnel 210a-b (e.g., local operators, or production operators) are located in facility 210 to resolve problems there, personnel 210c-d (e.g., remote operators)

are located in central control room 450 where they can resolve problems remotely (e.g., without going to the machines that have problems). User interfaces of the machines may have network connections that allow personnel 210*c-d* in central control room 450 to "remote in" to any selected machine. For example, in addition to providing information about a machine locally (e.g., on a monitor such as monitor 102) and accepting input locally (e.g., via one or more input devices) network 452 may make machine information available remotely and may allow input to the machine to be provided remotely. For example, some or all input and/or output devices of a user interface may be replicated in central control room 450 to allow remote access. For example, a touchscreen at a machine (e.g., monitor 102 configured as a touchscreen) may be replicated in central control room 450. When an alarm state occurs, the alarm condition may be indicated (e.g., on a monitor or otherwise) in central control room 450 and personnel 210*c-d* may access the machine that is in the alarm state (e.g., may bring up on a monitor in central control room 450 the same information available locally on monitor 102). Resolving problems remotely eliminates the time required to move from machine to machine. Some problems may require local intervention (e.g., to perform actions that cannot be performed remotely such as manual intervention to move stuck parts, remove debris, close doors or panels, reconnect connectors) so that personnel 210*a-b* may remain in facility 210. However, fewer personnel may be needed overall because of the higher efficiency of personnel 210*c-d* in central control room 450 and personnel in facility 210 may be significantly reduced.

Figure 5:
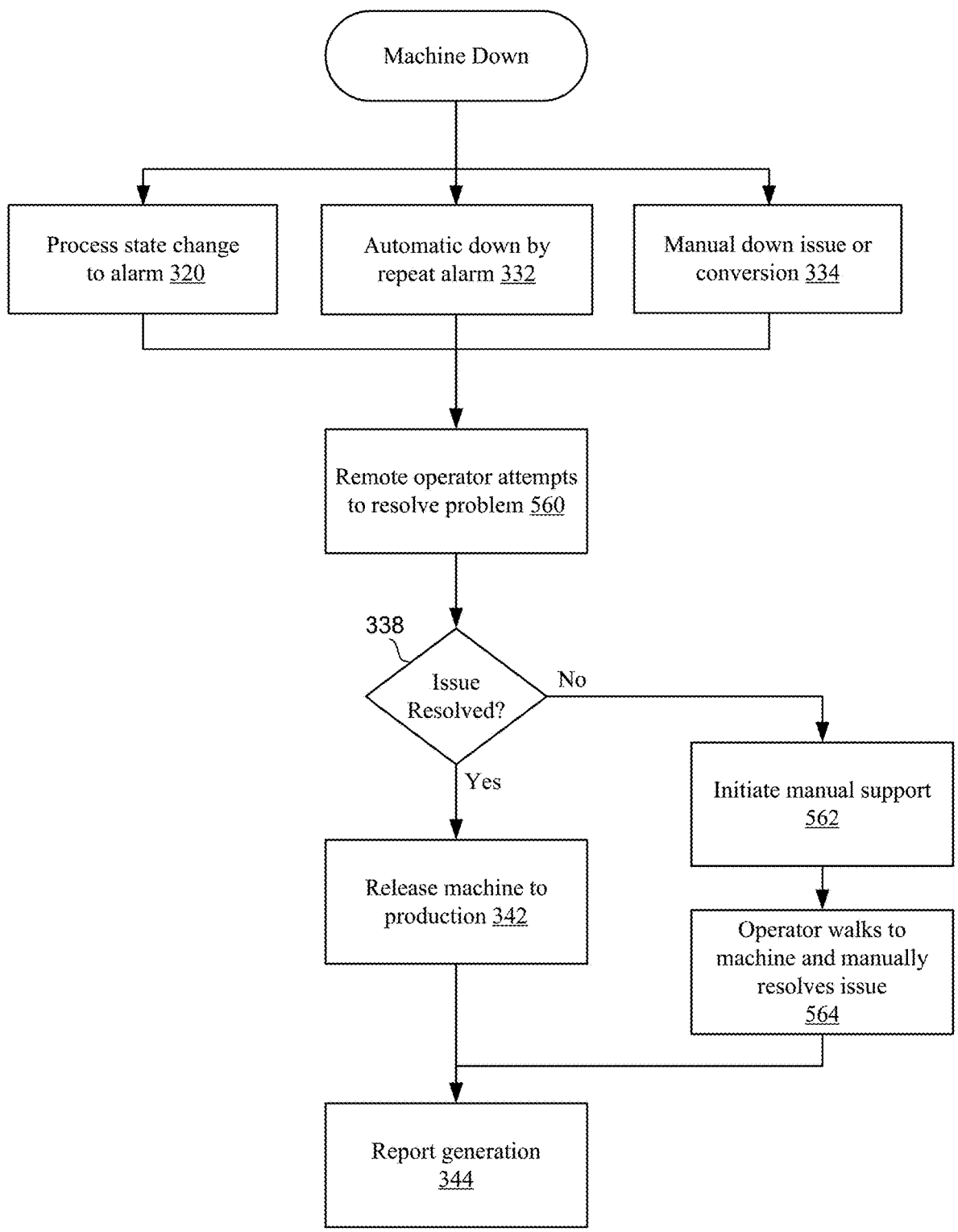
FIG. 5 illustrates an example of how alarms may be handled in a facility with a central control room.

FIG. 5 illustrates an example of how machine alarms may be resolved in a facility that uses facility personnel in a central control room (e.g., as illustrated in FIG. 4). A machine down (machine no longer running) may occur when a process state changes to alarm 320, as a result of an automatic down from repeat alarms 322 (e.g., repeated low-level alarms or warnings), or from a manual down issue or conversion 334 (e.g., facility personnel indicate the machine is down) as before. Any of these conditions may cause a machine state to change from a non-alarm state to an alarm state, which may cause a light tower or other output device to indicate the alarm state and may additionally send an alarm indicator to a remote operator (e.g., personnel in central control room 450). The remote operator attempts to resolve the problem 560 (e.g., pushes buttons, moves a pointer, enters text, or otherwise provides some input remotely) and determines if the issue is resolved 338. If the issue is not resolved by the remote user, then the remote user may initiate manual support 562 (e.g., by contacting facility personnel that are in the facility, close to the machine, for example, using digital communication with a digital device such as a smart watch). An operator (local user) then walks to the machine and manually resolves the issue 564. If the problem is resolved (e.g., if the machine transitions from an alarm state to a non-alarm state) then the machine is released to production 342 and a report is generated 344 (e.g., generated by the system).

Figure 6:
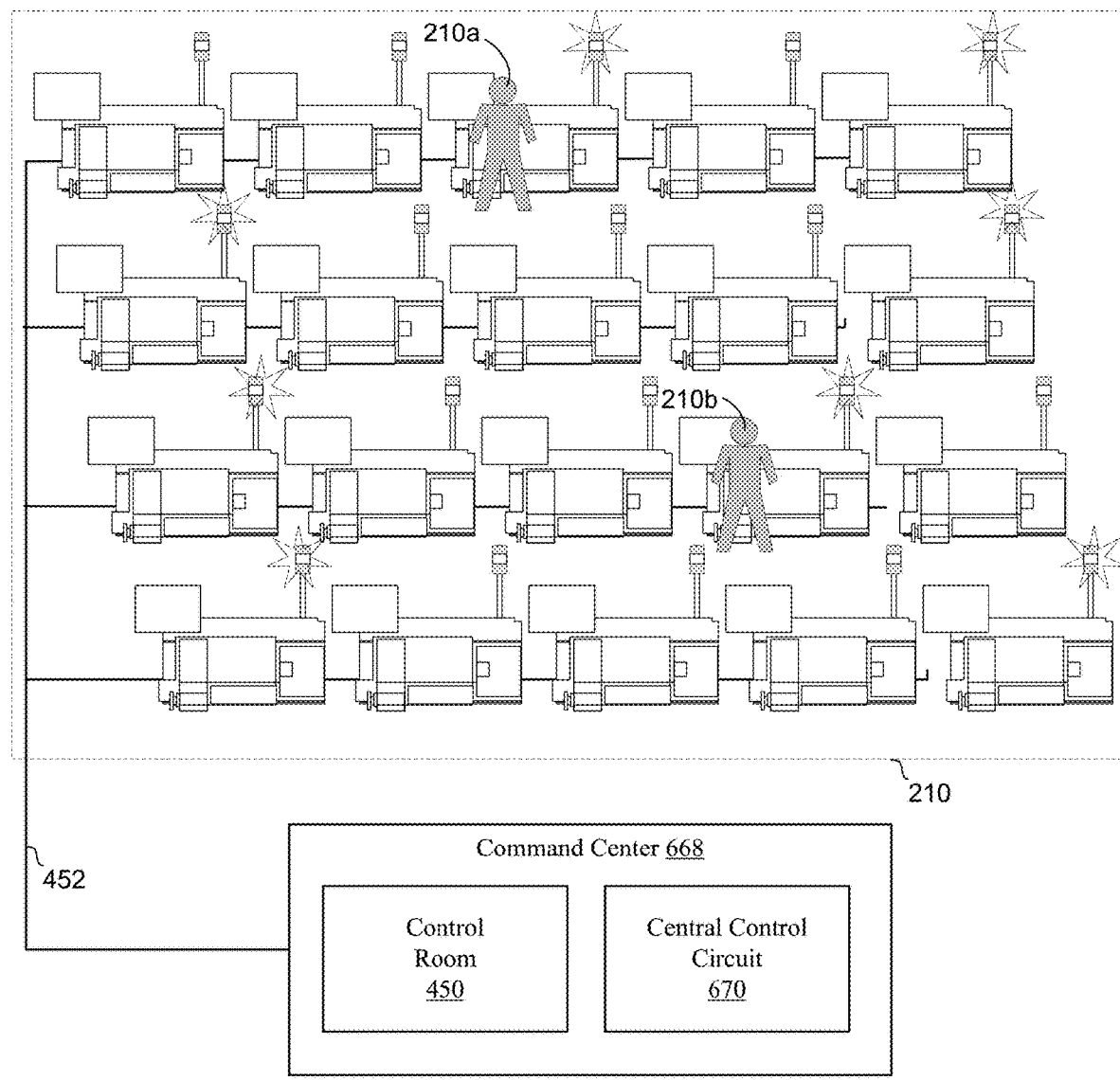
FIG. 6 illustrates an example of a plurality of machines connected to a central control circuit by a network.

FIG. 6 shows an alternative arrangement to those of FIGS. 2 and 4, including a command center 668 connected via network 452 to machines in facility 210. Command center 668 includes control room 450 and a central control circuit 670. Central control circuit 670 may be configured to respond to alarms (e.g., a machine transitioning from a non-alarm state to an alarm state) in order to return machines to production (e.g., to cause a machine to transition from an alarm state to a non-alarm state). Central control circuit 670 may be used instead of, or in addition to, central control room 450.

Figure 7:
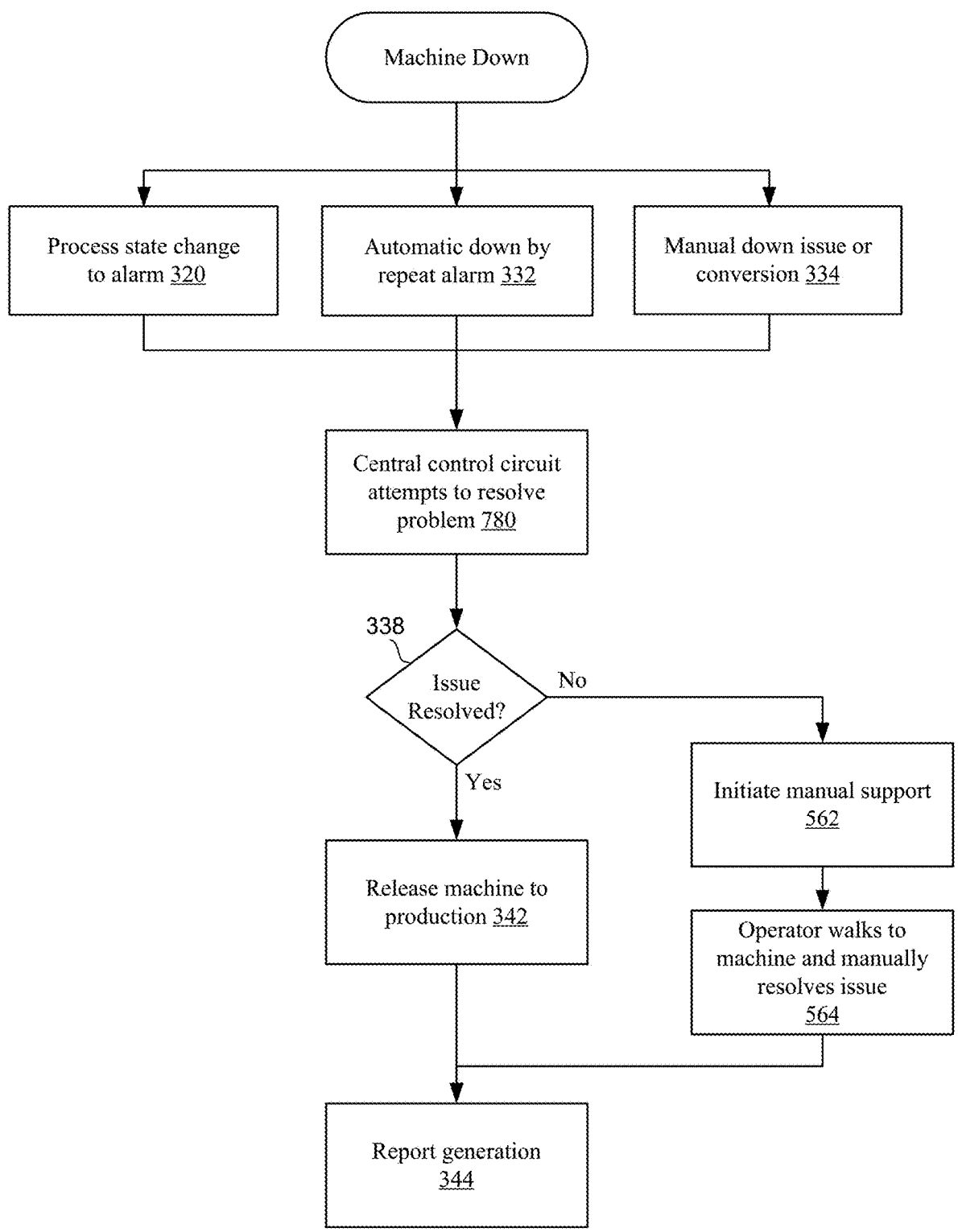
FIG. 7 illustrates an example of how alarms may be handled using a central control circuit.

FIG. 7 illustrates an example of how machine alarms may be resolved in a facility that uses a central control circuit (e.g., as illustrated in FIG. 6). A machine down (machine no longer running) may occur when a process state changes to alarm 320, as a result of an automatic down from repeat alarms 322 (e.g., repeated low-level alarms or warnings such as generated by a Recipe Management System, or RMS, which may lock a machine based on the alarm description and frequency), or from a manual down issue or conversion 334 (e.g., facility personnel indicate the machine is down) as before. Any of these conditions may cause a machine state to change from a non-alarm state to an alarm state, which may cause a light tower or other output device to indicate the alarm state and may additionally send an alarm indicator to central control circuit 670. The central control circuit attempts to resolve the problem 780 (e.g., provides some input, via network 452) and determines if the issue is resolved 338. If the issue is not resolved by the central control circuit 670, then central control circuit 670 may initiate manual support 562 (e.g., by contacting facility personnel that are in the facility, close to the machine, by a digital message such as a text message). An operator then walks to the machine and manually resolves the issue 564. If the problem is resolved (e.g., if the machine transitions from an alarm state to a non-alarm state) then the machine is released to production 342 and a report is generated 344 (e.g., by the central control circuit and/or logged by the machine).

Figure 8:
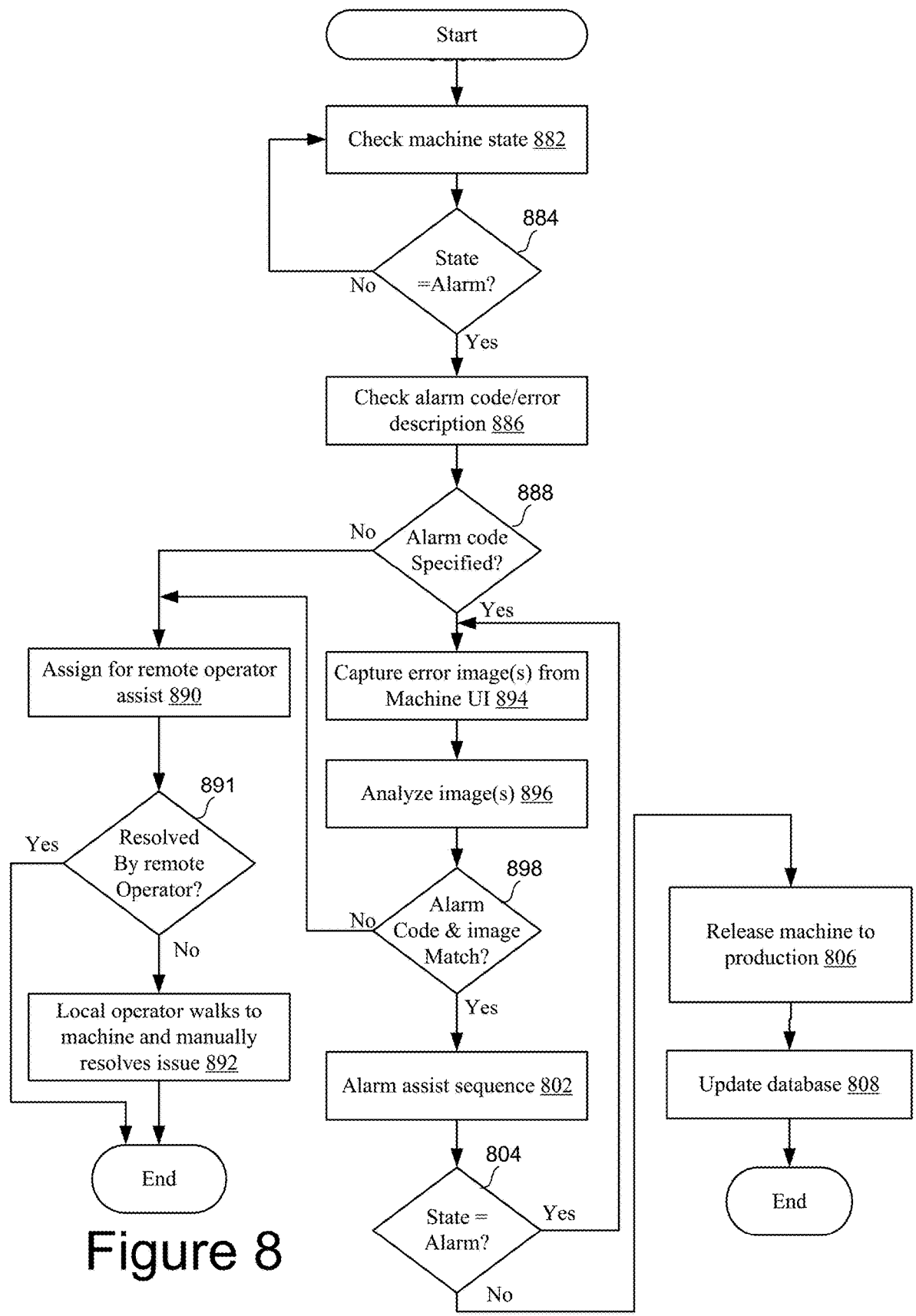
FIG. 8 illustrates an example of operation of a central control circuit.

FIG. 8 shows an example of operation of central control circuit 670. Central control circuit 670 checks machine status 882 and determines if the machine state is an alarm state 884. If the machine state is not an alarm state (e.g., a non-alarm state) then central control circuit 670 continues to check machine status. Some or all machines in a facility may be monitored in this way by central control circuit 670.

If the machine state is an alarm state, then central control circuit 670 checks the alarm code and/or error description 886. A machine (e.g., machine 100) may send an alarm code and/or error description to central control circuit 670 via network 452 whenever it transitions to an alarm state (or central control circuit 670 may request the alarm code and/or error description). The alarm code and/or error description provide information regarding the type of problem that caused the alarm. Central control circuit 670 may be configured to resolve a number of problems that are identified by respective alarm codes, while other problems may not be resolvable by central control circuit 670 (e.g., may require manual intervention at the machine). Central control circuit 670 determines whether the alarm code is specified 888 (e.g., compares the alarm code with a list of specified alarm codes corresponding to problems that can be resolved by central control circuit 670).

If the alarm code is not specified, then the error is assigned for remote operator assist 890. A remote operator (e.g., iCCS operator) attempts to resolve the error. The problem may be resolved by the remote operator 891, or if the problem is not resolved by the remote operator, then a local operator (production operator) walks to the machine and manually resolves the issue 892. If the alarm code is specified, then central control circuit 670 captures one or more error image(s) from the machine user interface (UI) 894 (e.g., screenshot(s) from the UI when an alarm state exists) and analyzes the image(s) 896. A determination is made as to whether the alarm code and image(s) match 898 (e.g., whether there is sufficient correlation between the image and an image that is expected based on the alarm code). If there is no match, then the error is assigned for remote operator assist 890 and, if the problem is not resolved by the remote operator 891, then a local operator (production operator) walks to the machine and manually resolves the issue 892 (e.g., in response to a digital message sent to a device such as a smart watch). If there is a match, then an automatic assist sequence 802 is initiated, which may include central control circuit 670 generating and sending one or more command to the machine (e.g., a machine learning application may be used to generate the automatic assist sequence as described in more detail below). After the alarm assist sequence, a determination 804 is made as to whether the machine state is an alarm state. If the machine state is an alarm state, then central control circuit returns to step 894 to capture another error image (the image may have changed in response to input provided) analyzes the image 896 and may assign for an operator assist or perform another alarm assist sequence. If the machine state is not an alarm state, then the machine is released to production 806 and a database is updated 808 (e.g., central control circuit 670 may create a record in a database indicating how the problem was resolved, by a central control circuit, by a remote operator, or by a local operator, which may be used to identify which alarm code(s) could benefit from improved machine further learning).

According to examples described below, central control circuit 670 includes or is connected to a machine learning application that applies machine learning to select an appropriate alarm assist sequence according (e.g., step 802) to captured image(s) from a machine user interface.

Figure 9A:
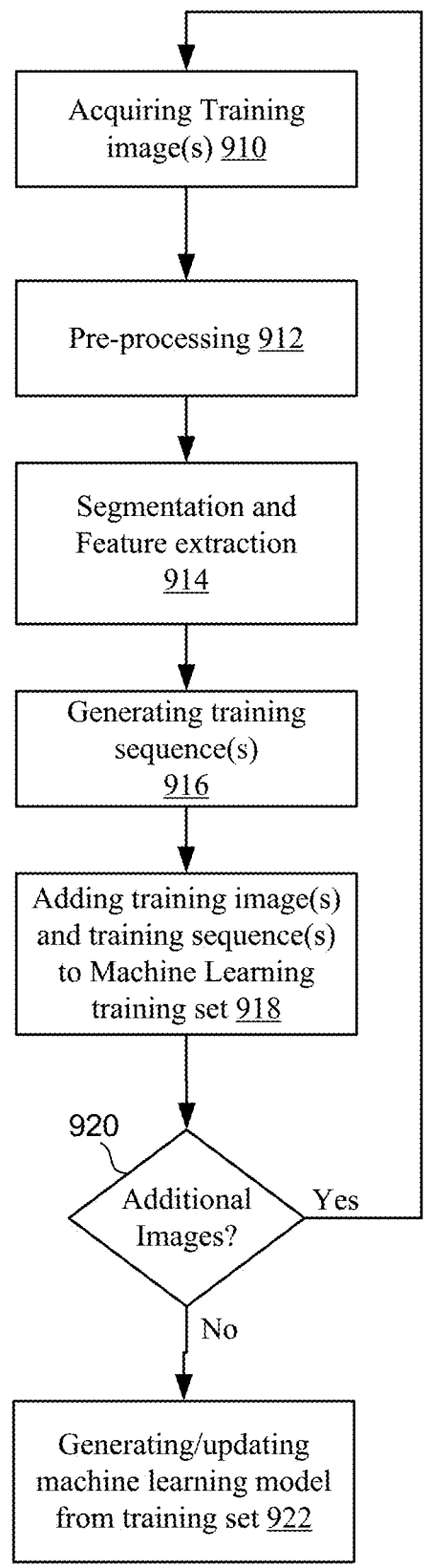
FIGS. 9A-D illustrate examples of certain aspects of a central control circuit.

FIG. 9A shows an example of a method of generating of a machine learning model that may be used to provide an alarm assist sequence. The method includes acquiring training image(s) 910 (e.g., error images from a machine UI). For example, where a central control room (e.g., central control room 450) is connected to machine UIs of multiple machines, one or more error image(s) (alarm images) may be captured remotely via a network (e.g., network 452) when a machine is in an alarm state. The method further includes pre-processing 912 of images, followed by segmentation and feature extraction 914. Pre-processing 912 may include applying Optical Image Recognition (OIR) to recognize text and/or other features that may be present in an image. Segmentation and feature extraction 914 may include segmenting an image (e.g., applying a grid) and identifying features of interest. Generating training sequence(s) 916 may include recording a sequence or sequences of actions (e.g., human input) that are responsive to the alarm associated with the error image(s). For example, a training sequence may be a record of a user's input, via a machine UI (either locally or remotely), that successfully resolved the problem that caused the alarm state (e.g., a sequence that caused the machine to transition to a non-alarm state). This may include input provided via a touchscreen, including pointer (cursor) movement, menu selection, feature selection (e.g., using mouse click or similar action), or via other input device of a machine UI. In some cases, a training sequence may be generated from a sequence of training images (e.g., the sequence of images may capture a user's input to the machine's UI). The training image(s) and training sequence(s) are then added to a machine learning training set 918. If additional training images are to be added 920, then the above sequence is repeated to add more training image(s) and training sequence(s) to the machine learning training set. If no additional images are to be added, then a machine learning model is generated or updated from the training set 922.

A machine learning application may apply a machine learning model (e.g., generated according to the method of FIG. 9A) to generate an output (e.g., a command or sequence of commands to a machine UI) according to the training set. For example, where a training set includes error images associated with machine alarm states and training sequences corresponding to actions that cause machines to transition to non-alarm states, the machine learning model may predict a sequence of actions to resolve the alarm state in response to a given image or images. While error images for a given problem (e.g., given alarm code) may not be identical, machine learning may enable a similar response to be provided for similar machine alarm states (e.g., as indicated by similar error images and/or alarm codes). A machine learning model may be updated as more alarm states are encountered and resolved (by either human user input or input from a machine learning application). It will be understood that a variety of machine learning approaches may be applied including decision tree learning, association rule learning, artificial neural networks, deep learning, inductive logic programming, support vector machines, clustering, bayesian networks, reinforcement learning, representation learning, similarity learning, metric learning, sparse dictionary learning, genetic algorithms, rule-based machine learning, learning classifier systems, or other approaches. Machine learning may be implemented using a variety of hardware including one or more processors which may be dedicated processors or may perform one or more other functions and may be implemented in stand-alone hardware or may be implemented in hardware that has other functionality (e.g., one or more computers or servers).

Figure 9B:
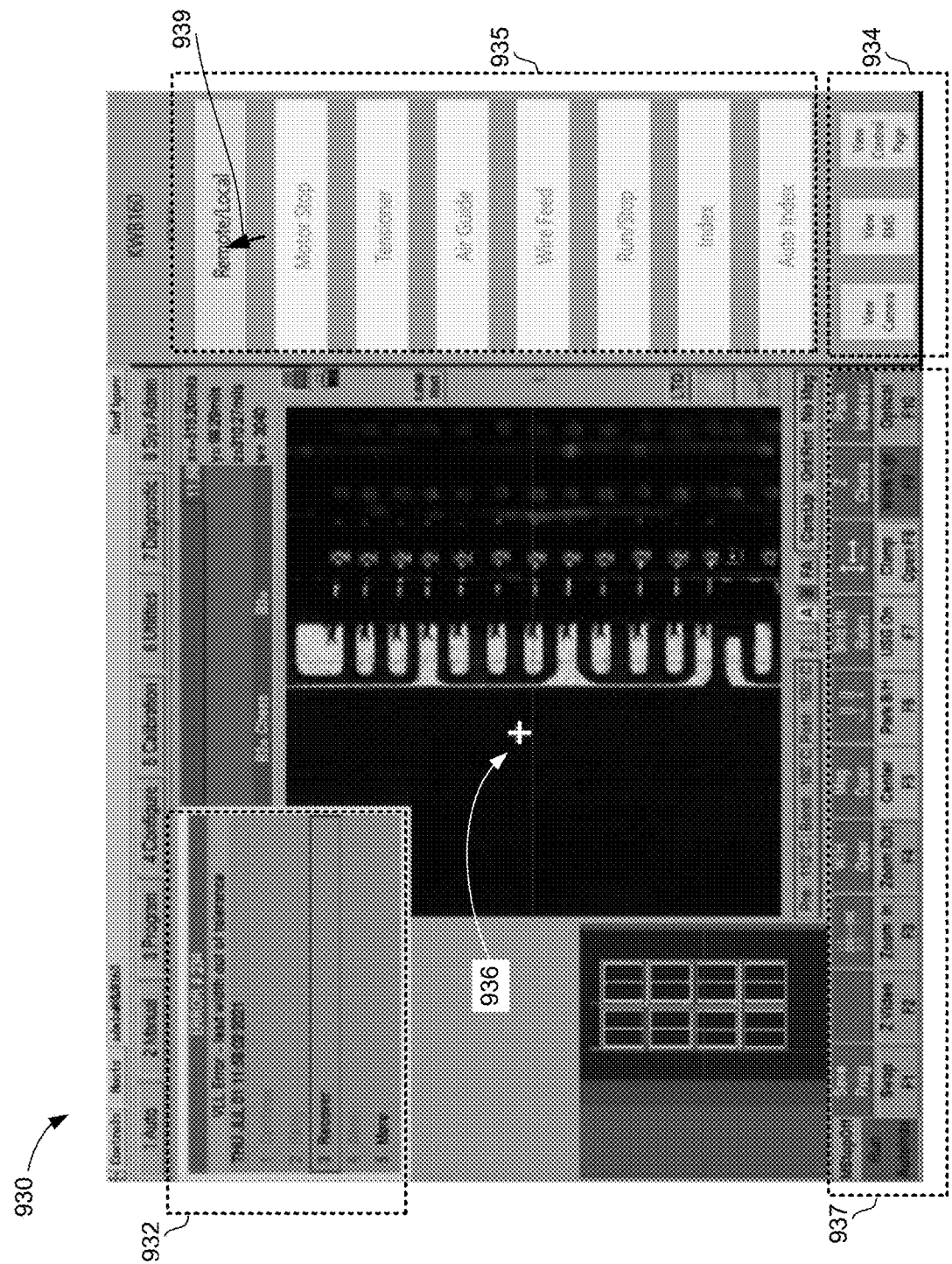

FIG. 9B illustrates an example of an error image 930 (alarm image) that may be used as a training image (e.g., acquired at step 910). FIG. 9B shows feature extraction (e.g., step 914) that identifies three features of interest including pop-up menu 932, buttons 934, 935, and 937 (buttons from the machine UI to interface with machine alarms), and machine UI pointer 936. Soft buttons 935 are disabled in FIG. 9B indicating that remote operation has not been initiated. Mouse arrow 939 is shown, indicating that a remote user or central control circuit is initiating remote operation. When remote operation is initiated, machine UI pointer is controlled remotely (e.g., mouse arrow 939 and machine UI pointer 936 become a combined pointer that is controlled remotely). An indicator in the machine UI may indicate whether control is local or remote. A training sequence may be generated from the movement of pointer 936 in a series of training images and mouse clicks or other input by a user. Error image 930 is associated with a particular alarm code (error #234) which is shown in the image and may be available to a remote user (e.g., in central control room 450) and/or a central control circuit (e.g., central control circuit 670) over a network (e.g., network 452).

Figure 9C:
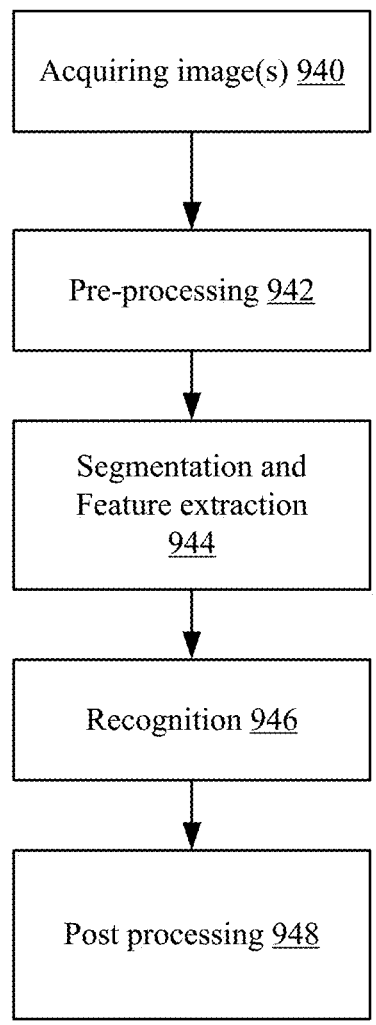

FIG. 9C illustrates an example of how central control circuit 670 may handle a machine error or alarm (e.g., an error image captured from a machine UI at step 894 in FIG. 8) using a machine learning or AI application in what may be referred to as an "Intelligent Self Alarm Assist" or "i-Assist" operation. The method includes acquiring image(s) 940, pre-processing 942 and segmentation and feature extraction 944 (these may be similar to pre-processing 912 and segmentation and feature extraction 914, which were previously described). The method further includes recognition 946 and post processing 948. Recognition 946 may include comparing the acquired image, or features of the acquired image, with features expected in such an image based on an associated alarm code. For example, where a teaching set includes images such as image 930 associated with alarm code #234, expected features may include pop-up menu 932, buttons 934, and pointer 936. If these features are not found (e.g., alarm code and image do not match at step 898 of FIG. 8) then the machine learning application may not be able to successfully resolve the problem and a remote operator may be assigned to assist. If recognition is successful, the post processed image and/or extracted features are output for generation of an alarm assist sequence by the machine learning application.

Figure 9D:
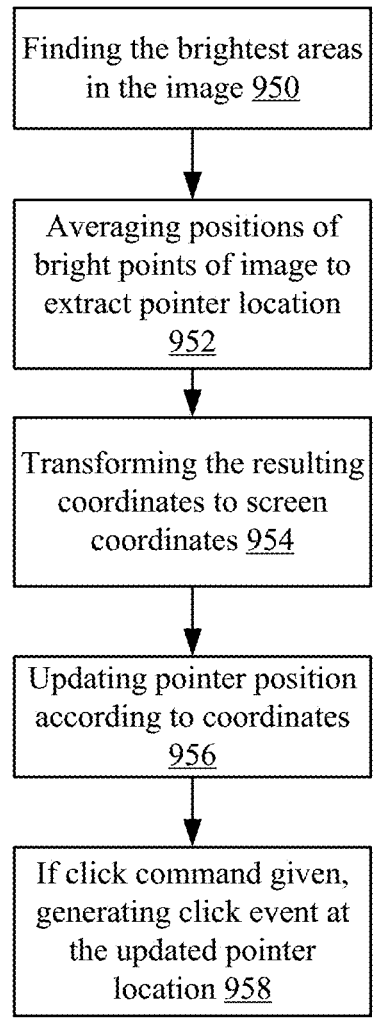

FIG. 9D shows an example of a method of generating a training sequence (e.g., step 916) from image(s). The method includes finding the brightest areas in the image(s) 950 and averaging positions of the brightest points of the image to extract the pointer location 952 (e.g., to find pointer 936 in image 930). The method further includes transforming the resulting coordinates to screen coordinates 954 (e.g., x and y coordinates on a touchscreen), updating the pointer position according to the coordinates 956 and, if a click command is given, generating a click event at the updated pointer location 958. Appropriate commands may be generated to implement steps 956 and 950 (e.g., commands to update a pointer location and generate a click event). From a training set that includes training sequences generated in this way, a machine learning application may generate a sequence of commands to respond to a given problem (e.g., to a given alarm code).

Figure 10:
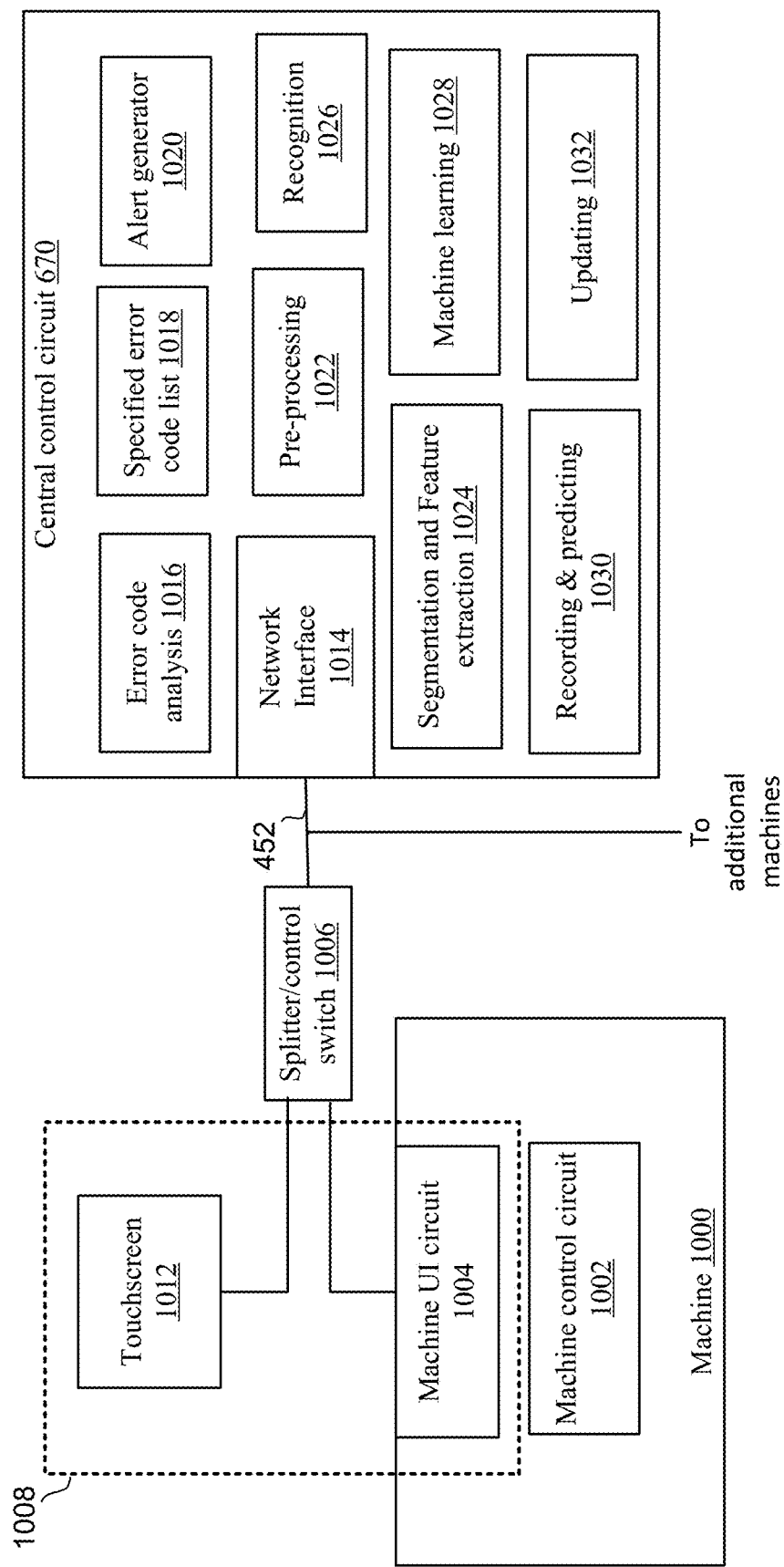
FIG. 10 illustrates an example implementation of a machine connected to a central control circuit over a network.

FIG. 10 shows a block diagram of an implementation of the present technology. Machine 1000 (e.g., any of machines 100a-t) includes a machine control circuit 1002, which may be connected to components of machine 1000 (e.g., sensors, detectors, cameras, transducers, motors, actuators, heaters, power controllers, RF generators) to receive signals (e.g., from sensors, detectors, cameras, transducers, or other components) and generate output signals (e.g., to motors, actuators, heaters, power controllers, RF generators or other components). Machine 1000 further includes machine UI circuit 1004 which may be connected to machine control circuit 1002 and may also be connected, through splitter/control switch 1006, to touchscreen 1012. The combination of machine UI circuit 1004, touchscreen 1012 and any other input, output, or input/output devices connected to machine UI circuit 1004 form user interface 1008 of machine 1000. Machine UI circuit 1004 may provide information to touchscreen 1012 (e.g., machine state; visual data such as images from one or more cameras; error codes; data regarding conditions such as temperature, pressure, humidity, power, current, voltage; data regarding recipes being run, workpieces processed or to be processed, or other data regarding operation of machine 1000) and may receive commands or other input from touchscreen 1012, which may be implemented by machine control circuit 1002.

Splitter/control switch 1006 enables data to be sent to central control circuit 670 instead of, or in addition to, touchscreen 1012 so that the same data may be sent to either or both of these components. Thus, central control circuit 670 may monitor output from machine UI circuit 1004 for an alarm state (e.g., monitor for an alarm code). Splitter/control switch 1006 further allows control from either central control circuit 670 (via network 452) and/or touchscreen 1012. For example, control may be assigned exclusively to either central control circuit 670 or touchscreen 1012 at any time with the other component being locked out to prevent conflict. In an example, when machine 100 is has an alarm state, central control circuit 670 may take control of machine 1000 via splitter/control switch 1006 and touchscreen 1012 may be locked out.

Central control circuit 670 includes a network interface 1014 for communication over network 452 (with machine 1000 and any additional machines that may be connected to network 452). Each machine or other device connected to network 452 may have a unique network address (e.g., Internet Protocol or IP address) so that the central control circuit 670 knows which machine any given data is coming from and can direct any commands to that machine. Central control circuit 670 includes error code analysis circuit 1016 for detecting and analyzing any error codes received from a machine (error code analysis circuit 1016 may be considered a means for monitoring the plurality of machines, which is connected to network 452 to receive alarm codes from the plurality of machines). Error codes may indicate specific error states that may be different for different machines. For example, error codes may include one or more of temperature-related error codes (e.g., overtemperature or undertemperature), pressure-related error codes (e.g., overpressure or underpressure), humidity-related error codes, chemical concentration related error codes, pH related error codes, voltage or current related error codes, alignment-related error codes (e.g., misalignment of one or more workpiece and/or machine component). Error code analysis circuit may compare any received error codes with entries in specified error code list 1018 to determine if the error code is specified (specified error code list 1018 may be considered a means for determining whether alarm codes correspond to machine states for which a machine learning application has been trained). Errors and associated alarm codes may be specific to one or more types of machine (e.g., different machines may have different failure modes that are indicated by different alarm codes) and specified error code list 1018 may be divided into machine specific subsets so that a given alarm code for a given machine (as indicated by IP address) may require searching only a subset of specified error code list 1018. If an error code is not specified, then alert generator 1020 may generate an alert to an operator (and/or other personnel) to attend to machine 1000 (e.g., a digital alert via an electronic device such as a smartphone, tablet, smartwatch, or other device). If the error code is specified, an error image or images may be captured and pre-processed by pre-processing circuit 1022 and segmentation and feature extraction may be performed by segmentation and feature extraction circuit 1024. Recognition circuit 1026 may determine whether the image(s) are sufficiently correlated with corresponding images for the same error code to allow use of a machine learning application. A machine learning circuit 1028 (e.g., a circuit running a machine learning application or AI application) may generate an assist sequence (one or more commands) based on the images and/or extracted features and commands to implement the assist sequence may be sent by network interface 1014 to machine 1000. Machine learning circuit 1028 may be considered a means for generating one or more commands using the machine learning application and sending the one or more commands to the user interface to change the machine state.

Central control circuit 670 also includes recording and predicting circuit 1030, which may record alarm codes that are received, and the assist sequences generated in response, and may additionally make predictions based on the alarm codes and assist sequences. For example, certain alarm codes may be associated with failure modes that provide a high probability of non-functional or poorly functioning workpieces. When such alarm codes occur, recording and predicting circuit 1030 may predict a high failure rate for an associated workpiece, lot, die or other unit. The workpiece, lot, die or other unit may be scrapped based on this prediction, may be subject to immediate testing to see if it is viable, or may be flagged for extra testing after manufacturing is complete. Records generated by recording and predicting circuit 1030 may be used by updating circuit 1032 to update a machine learning model (e.g., to update a training set used by a machine learning application running on machine learning circuit 1028). Recording and predicting circuit 1030 and updating circuit 1032 may be considered a means for updating a machine learning model by recording successful human and machine responses.

The components of central control circuit 670 may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each module may include or comprise software stored in a processor readable device (e.g., memory) to program one or more processors for central control circuit 670 to perform the functions described herein. While the term "central control circuit" is used in the present document, the word "central" does not imply any particular location and a central control circuit may be located in or near a facility that contains the machines, in a command center (e.g., command center 668), in or near a control room 450, or may be at a remote location or locations that are not in or near machines or a control room. In an example, a single central control circuit may be connected to machines in a plurality of locations (e.g., different manufacturing facilities in different locations, including different time zones and/or different countries). In another example, different machines in a manufacturing facility may be connected to different central control circuits (e.g., operated by different machine vendors).

Figure 11A:
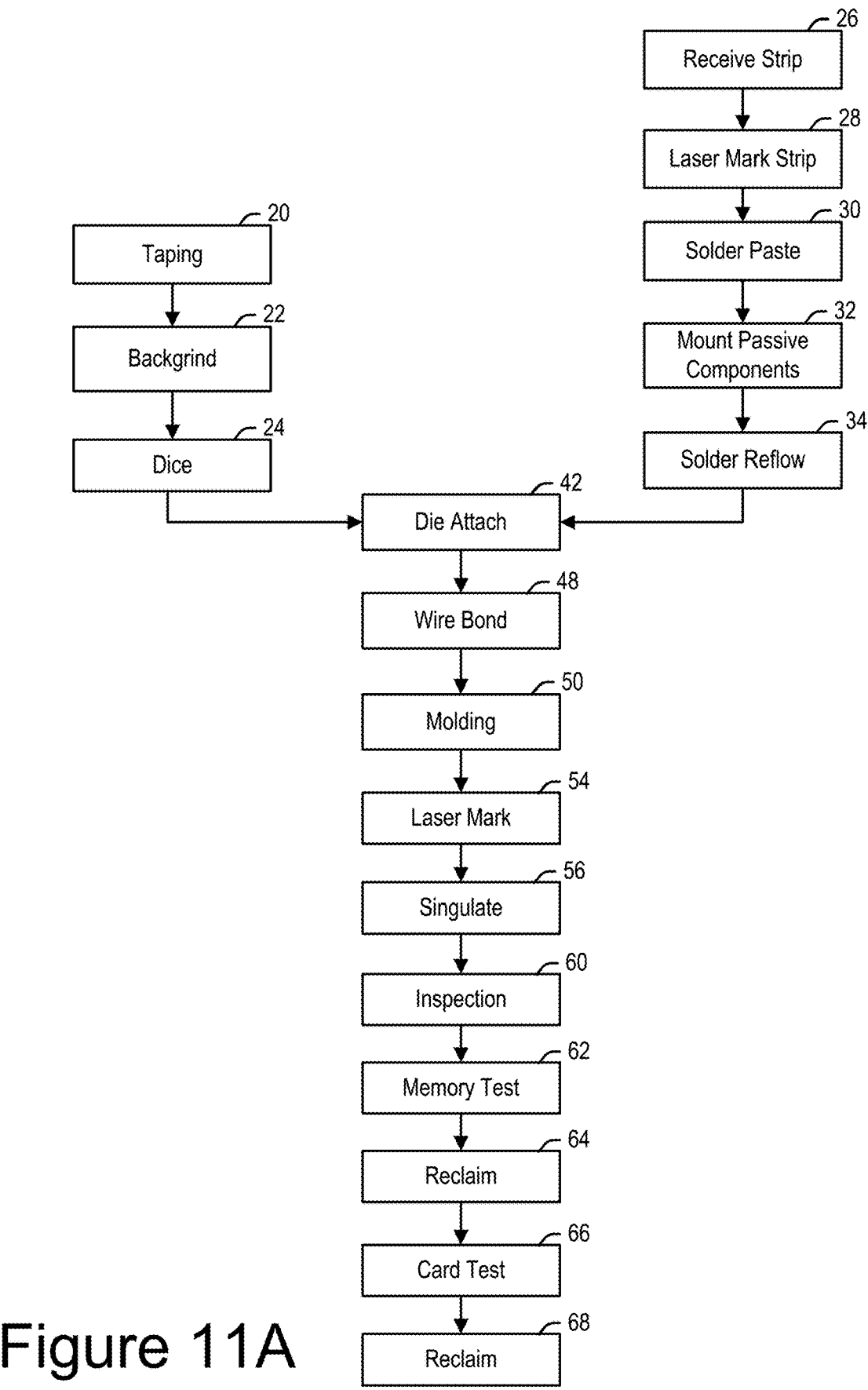
FIGS. 11A-B illustrate an example process that uses multiple machines, which may be connected to a central control circuit.
Figure 11B:
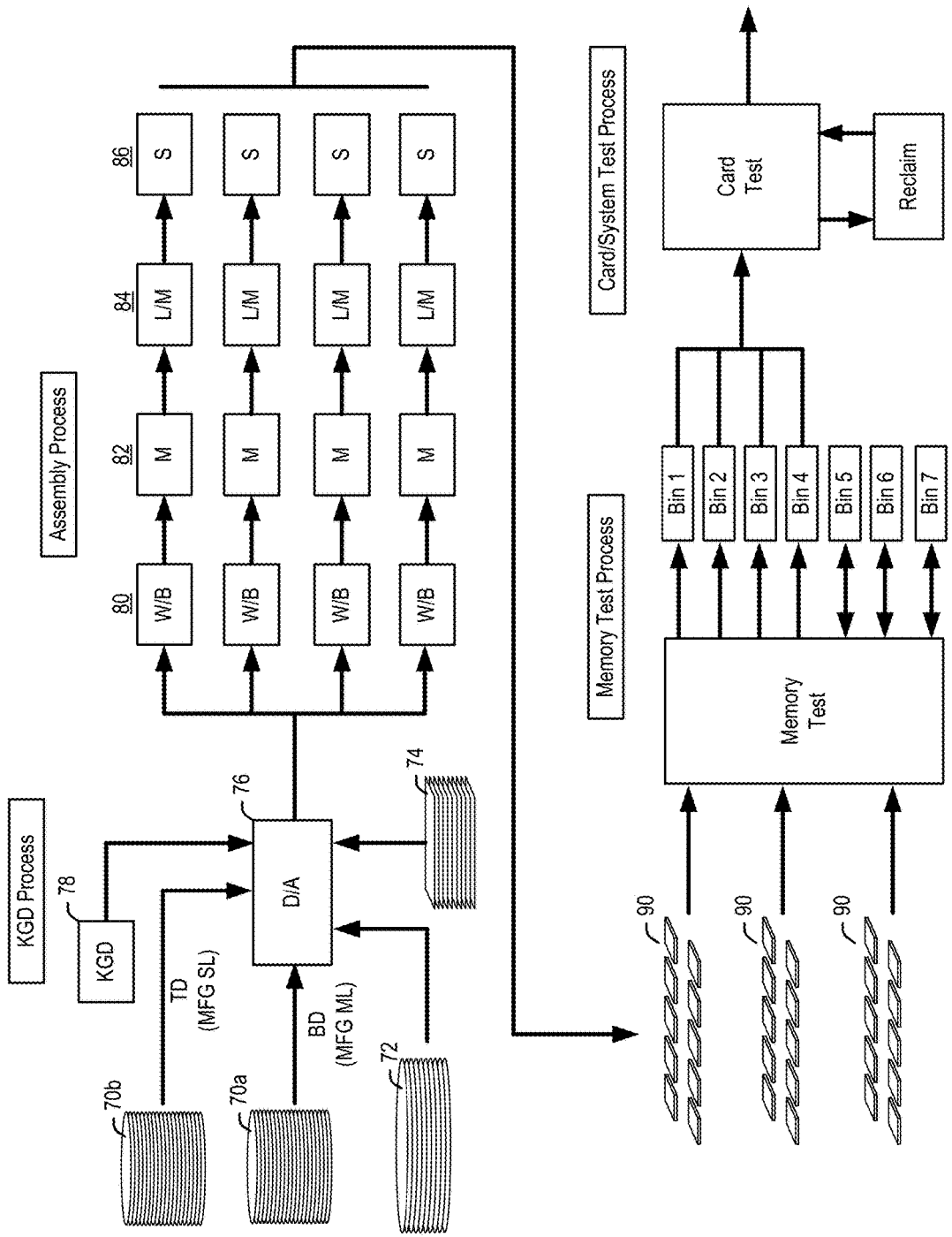

Aspects of the present technology may be applied to a wide range of machines in a range of different facilities. FIGS. 11A-B respectively show a flowchart and schematic representation of steps in the production of semiconductor device memory cards (a similar process may be used in the production of SSDs). While this is provided as one example of a manufacturing process in a manufacturing facility that may benefit from aspects of the present technology, the present technology is not limited to this, or any other example described here.

Referring to prior art FIGS. 11A-B, memory die wafer lots 70*a-b* and controller die lot 72 are received in a memory card fabrication plant from wafer piece manufacturers. The wafers arrive with the integrated circuits defined thereon by the wafer piece manufacturers so that each memory die wafer piece includes a plurality of memory die, and each controller die wafer piece includes a plurality of controller die. In the embodiment shown, a semiconductor device is being fabricated including a pair of memory die. Thus, two memory die wafer lots 70*a* and 70*b* are shown. It is also known to form semiconductor devices with one or more than two memory die. The wafer lot 70*a* used for the bottom memory die may be referred to as the wafer mother lot, while wafer lot(s) used for memory die above the bottom die may be referred to as the wafer sublots. Substrate lots 74 are also received in the memory card fabrication plant from a substrate manufacturer. The substrates in a substrate lot 74 may for example be a printed circuit board (PCB), leadframe or tape automated bonding (TAB) tape.

In order to prepare the wafer pieces in the wafer lots 70, 72 for affixation to a substrate in substrate lot 74, each wafer piece may have a protective tape applied to its active surface (the surface including the integrated circuits) and is then mounted to a chuck (not shown), active side down in step 20. Thereafter, a backgrind step 22 may be performed (e.g., by a backgrind machine) on each wafer piece to thin the wafer down to a desired thickness. After backgrind step 22, the wafer pieces may be transferred to another machine where they are diced (e.g., by a dicing machine), for example by saw or laser, in step 24 so that they may be picked and placed onto the substrate.

In parallel with the die preparation steps, the substrate strips are received from the substrate strip manufacturer and processed. The strips are received in step 26. The strip manufacturer may mark individual substrates on the strip which were identified as bad substrates and unusable. Individual substrates may also come from the strip manufacturer with an x-y location etched on the back of the substrate site.

In step 28, passive components may be mounted on the substrates of the strip in a surface mounting process (e.g., in a surface mount machine). The solder paste may be applied in step 30. The passive components, also referred to herein as passives, may be mounted in step 32, and the solder may reflowed/cleaned in a step 34. The passives may include for example resistors and capacitors.

In step 42, the memory die and a controller die may be mounted on a substrate at a die attach machine 76. The die attach machine 76 makes use of a known good die (KGD) map 78 which defines good and bad die for each wafer piece used. In particular, each die on each wafer piece in wafer lots 70, 72 may be operationally tested (e.g., in a test machine) and given a rating such as 0,0 (flawless), A,A (good) or 1,1 (bad). The KGD map 78 is used by the die attach machine so that bad die on a wafer piece are ignored. In step 42, memory die and typically a controller die are mounted on a substrate to form a semiconductor device. As used in this context, the term "device" refers to an assembly of a substrate, one or more semiconductor die on the substrate and, possibly, passive components on the substrate. The respective die, substrate and/or passives within a device may be referred to herein as "discrete components" of the semiconductor device.

Following the mounting of the die and passives on a substrate, the resulting device may then be wire bonded in step 48 (e.g., by a wire bonding machine). The wire bonding step 48 is a time consuming process. As such, the device assembly lots may be split into a plurality of device assembly sublots so that wire bonding may be performed by a plurality of wire bonding machines 80 simultaneously. In the wire bonding step 48, die bond pads on each of the die mounted to a substrate may be electrically coupled to contact pads on the substrate.

Following the wire bond step 48, the devices in the respective device assembly sublots may be encapsulated in a molding compound (step 50) in one or more machines 82, laser marked with an identifier (step 54) in one or more marking machines 84, and then singulated (step 56) in one or more singulating machines 86. FIG. 11B shows the device assembly sublots remaining separated through each of these steps. However, one or more of the device assembly sublots may be reassembled into the device assembly lot following any of the steps 48 through 56.

After singulation, semiconductor devices 90 may be inspected (step 60) and then put through one or more tests in step 62 (e.g., by test machine). These tests may include for example burn-in and memory read-write testing at high and low temperatures. Typically, semiconductor devices 90 from a number of device assembly lots are combined in the testing step.

The devices from respective assembly lots are reshuffled into different bins, depending on how the devices performed in the testing operations. In one example, it is known to divide the devices into seven bins (1-7), where devices classified in bins 1-4 have satisfactorily passed the testing operations and are passed on to a card test, described below. Devices classified in bins 5-7 failed the testing operation for one reason or another and are subjected to a reclaim step 64 where they are retested. The reclaim operations will vary depending on whether a device was classified in bin 5, bin 6 or bin 7. A device may go through multiple reclaim processes. If, after one or more of these reclaim processes, a device is found to operate satisfactorily, it may be reclassified into one of bins 1-4 and passed on to the card test.

The card test in step 66 may be similar to the memory test in step 62, however content may be written to each device and its capabilities tested. Card test may have a similar binning operation, where devices classified in certain bins are submitted for retest in a reclaim operation in step 68. Devices 90 which pass the card test may undergo some final inspection and processing steps (not shown) and then shipped.

In semiconductor memory card and SSD manufacturing/test facilities, the memory cards go through a number of distinct processes, which may be performed by a number of different machines, as indicated in FIGS. 11A-B. Some or all of the machines in such a facility, including any of the machines discussed above, may be connected to a central control circuit (e.g., central control circuit 670) so that when any such machine experiences an alarm state, the central control circuit may attempt to resolve the problem (return the machine to a non-alarm state) without human intervention.

Figure 12:
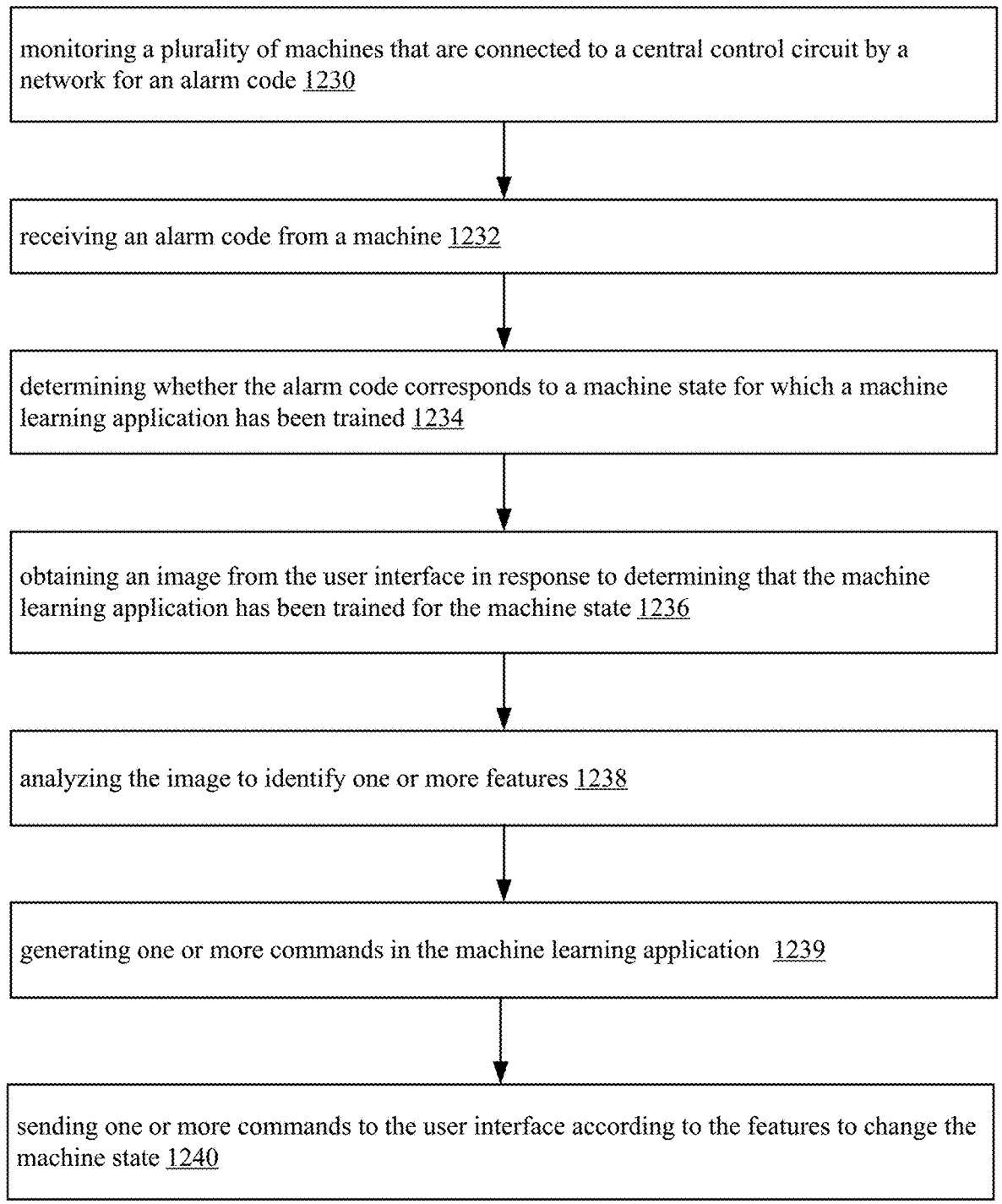
FIG. 12 shows an example method of operating a plurality of machines connected to a central control circuit e.g., in a command center.

FIG. 12 shows an example of a method according to aspects of the present technology. The method includes monitoring user interfaces of a plurality of machines that are connected to a central control circuit by a network for an alarm code 1230 (e.g., central control circuit 670 monitoring machines 100*a-t*), receiving an alarm code from a user interface of a machine 1232, and determining whether the alarm code corresponds to a machine state for which a machine learning application has been trained 1234 (e.g., error code analysis circuit 1016 checking specified error code list 1018). The method further includes obtaining an image from the user interface in response to determining that the machine learning application has been trained for the machine state 1236 (e.g., an error image such as image 930), analyzing the image to identify one or more features 1238 (e.g., as illustrated in FIGS. 9B-C); generating one or more commands in the machine learning application 1239; and sending one or more commands to the user interface according to the features to change the machine state (e.g., commands to move a pointer and/or click at a location).

A person of ordinary skill in the art will recognize that the technology described herein is not limited to a single specific memory structure, but covers many relevant memory structures within the spirit and scope of the technology as described herein and as understood by one of ordinary skill in the art.

One embodiment includes an apparatus comprising: a central control circuit configured to remotely connect to a plurality of machines over a network, each machine having a respective user interface to indicate a machine state of the machine and enable user input to the machine, the central control circuit configured to: receive an alarm code from a user interface of a machine; determine whether the alarm code corresponds to a machine state for which a machine learning application has been trained; obtain an image from the user interface in response to a determination that the machine learning application has been trained for the machine state; analyze the image to identify one or more features; generate one or more commands in the machine learning application; and send the one or more commands to the user interface according to the features to change the machine state.

The central control circuit may be further configured to receive an additional alarm code from a user interface of an additional machine, determine whether the additional alarm code corresponds to a condition for which the machine learning application has been trained, and send a digital alert to one or more human recipients to indicate an alarm state of the additional machine in response to a determination that the additional alarm code does not correspond to a condition for which the machine learning application has been trained. The central control circuit may be further configured to determine that the alarm code corresponds to a condition for which the machine learning application has been trained by searching a list that includes a plurality of alarm codes corresponding to conditions for which the machine learning application has been trained. The central control circuit may be further configured to monitor the machine state to determine whether the machine state changes from an alarm state to a non-alarm state in response to sending the one or more commands to the user interface. The central control circuit may be further configured to obtain one or more additional images from the user interface in response to a determination that the machine state has not changed from the alarm state; analyze the one or more additional images to identify one or more additional features; generate one or more additional commands in the machine learning application; and send the one or more additional commands to the user interface according to the additional features to change the machine state. The central control circuit may be further configured to send a digital alert to one or more human recipients to indicate the alarm state of the machine in response to a determination that the machine state has not changed from the alarm state to the non-alarm state in response to the one or more additional commands. The image may correspond to a screenshot from the user interface and the central control circuit may be further configured to compare the one or more features of the image with one or more features of images of a teaching set to determine whether the image correlates with the images of the teaching set. The teaching set may include recorded human input in response to the images of the teaching set that resulted in machine state changes from alarm states to non-alarm states. The one or more commands may correspond to human input of the teaching set including at least one of pointer movement, feature selection, selection from drop-down or pop-up menu, and text entry.

An example method includes: monitoring user interfaces of a plurality of machines that are connected to a central control circuit by a network for an alarm code; receiving an alarm code from a user interface of a machine; determining whether the alarm code corresponds to a machine state for which a machine learning application has been trained; obtaining an image from the user interface in response to determining that the machine learning application has been trained for the machine state; analyzing the image to identify one or more features; generating one or more commands in the machine learning application; and sending the one or more commands to the user interface according to the features to change the machine state.

The method may further include receiving an additional alarm code from a user interface of an additional machine; determining whether the additional alarm code corresponds to a condition for which the machine learning application has been trained; and sending a digital alert to one or more human recipients to indicate an alarm state of the additional machine in response to determining that the additional alarm code does not correspond to a condition for which the machine learning application has been trained. The method may further include determining that the alarm code corresponds to a condition for which the machine learning application has been trained by searching a list that includes a plurality of alarm codes corresponding to conditions for which the machine learning application has been trained. The method may further include determining whether the machine state changes from an alarm state to a non-alarm state in response to sending the one or more commands to the user interface; in response to determining that the machine state has not changed from the alarm state to the non-alarm state: obtaining one or more additional images from the user interface; analyzing the one or more additional images to identify one or more additional features; generating one or more additional commands in the machine learning application; sending the one or more additional commands to the user interface according to the additional features to change the machine state; and subsequently, in response to determining that the machine state has not changed from the alarm state to the non-alarm state, sending a digital alert to one or more human recipients to indicate the alarm state of the machine. The image may correspond to a screenshot from the user interface and the method may further include comparing the one or more features of the image with one or more features of images of a teaching set to determine whether the image correlates with the images of the teaching set. The method may include, prior to receiving the alarm code, generating a teaching set by recording human input in response to alarms; and training the machine learning application using the teaching set. The one or more commands may correspond to human input of the teaching set including at least one of pointer movement, feature selection, selection from drop-down or pop-up menu, and text entry.

An example apparatus includes a plurality of machines including at least one of manufacturing machines and testing machines, each machine having a respective user interface to indicate a machine state of the machine and enable user input to the machine; a network connecting user interfaces of the plurality of machines to enable remote access to user interfaces of the plurality of machines; means for monitoring and controlling the plurality of machines, the means for monitoring and controlling is connected to the network to receive alarm codes from the plurality of machines; means for determine whether alarm codes correspond to machine states for which a machine learning application has been trained; and means for generating one or more commands using the machine learning application and sending the one or more commands to the user interface to change the machine state.

The plurality of machines may include one or more of a backgrind machine, a dicing machine, a surface mount machine, a ball grid array (BGA) machine, a die attach machine, a test machine, and a wire bonding machine. The alarm codes may include one or more of temperature-related error codes, pressure-related error codes, and alignment-related error codes. The apparatus may further include means for updating a machine learning model by recording successful human and machine responses.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
   a central control circuit configured to remotely connect to a plurality of machines over a network, each machine having a respective local user interface to indicate a machine state of the machine and enable local user input to the machine and having a control switch to enable remote replication of local user interface images and remote control of the machine, the central control circuit configured to:
   receive a plurality of alarm codes including a first alarm code and a second alarm code from a local user interface of a machine;
   determine whether the plurality of alarm codes correspond to machine states for which a machine learning application has been trained;
   obtain an image from the local user interface in response to a determination that the machine learning application has been trained for a first machine state corresponding to the first alarm code, the image corresponding to a screenshot displayed on the monitor of the local user interface;
analyze the image to identify one or more features and compare the one or more features of the image with one or more features of images of a teaching set to determine whether the image correlates with the images of the teaching set;
generate one or more commands in the machine learning application according to correlation of the image and the images of the teaching set;
send the one or more commands to the local user interface according to the features to change the machine state to a non-alarm state; and
assign a machine error associated with the second alarm code to a human operator without assistance of the machine learning application in response to determining that the machine learning application has not been trained for the second machine state corresponding to the second alarm code.

2. The apparatus of claim 1 wherein the central control circuit is further configured to:
receive an additional alarm code from a local user interface of an additional machine;
determine whether the additional alarm code corresponds to a condition for which the machine learning application has been trained; and
send a digital alert to one or more human recipients to indicate an alarm state of the additional machine in response to a determination that the additional alarm code does not correspond to a condition for which the machine learning application has been trained.

3. The apparatus of claim 1 wherein the central control circuit is further configured to determine that the alarm code corresponds to a condition for which the machine learning application has been trained by searching a list that includes a plurality of alarm codes corresponding to conditions for which the machine learning application has been trained.

4. The apparatus of claim 1 wherein the central control circuit is further configured to monitor the machine state to determine whether the machine state changes from an alarm state to a non-alarm state in response to sending the one or more commands to the local user interface.

5. The apparatus of claim 4 wherein the central control circuit is further configured to:
obtain one or more additional images from the local user interface in response to a determination that the machine state has not changed from the alarm state;
analyze the one or more additional images to identify one or more additional features;
generate one or more additional commands in the machine learning application; and
send the one or more additional commands to the local user interface according to the additional features to change the machine state.

6. The apparatus of claim 5 wherein the central control circuit is further configured to send a digital alert to one or more human recipients to indicate the alarm state of the machine in response to a determination that the machine state has not changed from the alarm state to the non-alarm state in response to the one or more additional commands.

7. The apparatus of claim 1 wherein the image corresponds to a screenshot associated with the alarm code including information regarding an alarm state of the machine.

8. The apparatus of claim 1 wherein the teaching set includes recorded human input in response to the images of the teaching set that resulted in machine state changes from alarm states to non-alarm states.

9. The apparatus of claim 8 wherein the one or more commands correspond to human input of the teaching set including at least one of pointer movement, feature selection, selection from drop-down or pop-up menu, and text entry.

10. A method comprising:
monitoring a plurality of machines that each has a user interface that includes a monitor for monitoring of the machine by a local user and a local input device for control of the machine by the local user, the user interface of each machine is connected to a central control circuit by a network;
acquiring a training screenshot at the central control circuit from a user interface of a machine in an alarm state;
subsequently, recording a sequence of human input to resolve the alarm state;
adding the training screenshot and the sequence of human input to a training set that includes additional training screenshots and additional sequences of human input;
subsequently, generating a machine learning model for a machine learning application from the training image, the additional training images, the sequence and the additional sequences of human input;
subsequently, receiving an alarm code from a user interface of a machine;
determining that the alarm code corresponds to the alarm state that was used to generate the machine learning model for the machine learning application has been trained;
subsequently, obtaining a screenshot from the user interface of the machine in response to determining that the machine learning application has been trained for the alarm state;
analyzing the screenshot to identify one or more features;
generating one or more commands in the machine learning application according to the machine learning model that was generated using the training image and the sequence of human input; and
sending the one or more commands to the user interface of the machine to resolve the alarm state.

11. The method of claim 10 further comprising:
receiving an additional alarm code from an additional machine;
determining whether the additional alarm code corresponds to a condition for which the machine learning application has been trained; and
sending a digital alert to one or more human recipients to indicate an alarm state of the additional machine in response to determining that the additional alarm code does not correspond to a condition for which the machine learning application has been trained.

12. The method of claim 10 further comprising determining that the alarm code corresponds to a condition for which the machine learning application has been trained by searching a list that includes a plurality of alarm codes corresponding to conditions for which the machine learning application has been trained.

13. The method of claim 10 further comprising:
determining whether the machine state changes from an alarm state to a non-alarm state in response to sending the one or more commands to the user interface;
in response to determining that the machine state has not changed from the alarm state to the non-alarm state:

obtaining one or more additional images from the user interface;

analyzing the one or more additional images to identify one or more additional features;

generating one or more additional commands in the machine learning application;

sending the one or more additional commands to the user interface according to the additional features to change the machine state; and subsequently, in response to determining that the machine state has not changed from the alarm state to the non-alarm state, sending a digital alert to one or more human recipients to indicate the alarm state of the machine.

14. The method of claim 10 further comprising:

comparing the one or more features of the image with one or more features of images of a teaching set to determine whether the image correlates with the images of the teaching set.

15. The method of claim 10 wherein analyzing the screenshot includes finding the brightest areas of the image and updating pointer position and generating the one or more commands includes generating a click event at the updated pointer position.

16. The method of claim 10 wherein the one or more commands correspond to human input of the teaching set including at least one of pointer movement, feature selection, selection from drop-down or pop-up menu, and text entry.

17. An apparatus comprising a plurality of machines including at least one of manufacturing machines and testing machines, each machine having a respective user interface to indicate a machine state of the machine and enable user input to the machine and each machine having a control switch to enable remote replication of local user interface images and remote control of the machine;

a network connecting user interfaces of the plurality of machines to enable remote access to user interfaces of the plurality of machines through respective control switches;

means for monitoring and controlling the plurality of machines, the means for monitoring and controlling is connected to the network to receive a plurality of alarm codes including a first alarm code and a second from the plurality of machines and to obtain screenshots from respective user interfaces of the plurality of machines;

means for determining that the first alarm code corresponds to a first machine state for which a machine learning application has been trained, obtaining a screenshot corresponding to the first machine state, determining that the second alarm code corresponds to a second machine state for which the machine learning application has not been trained and in response assigning resolution of a machine error associated with the second alarm code to a human operator; and means for analyzing the screenshots and for generating one or more commands using the machine learning application and sending the one or more commands to the user interface to change the machine state from an alarm state to a non-alarm state.

18. The apparatus of claim 17 wherein the plurality of machines includes one or more of a backgrind machine, a dicing machine, a surface mount machine, a die attach machine, a test machine, and a wire bonding machine.

19. The apparatus of claim 18 wherein the alarm codes include one or more of temperature-related error codes, pressure-related error codes, and alignment-related error codes.

20. The apparatus of claim 17 further comprising means for updating a machine learning model by recording successful human and machine responses.

* * * * *